US007617031B2

(12) United States Patent
Li

(10) Patent No.: US 7,617,031 B2
(45) Date of Patent: Nov. 10, 2009

(54) SERIES ARRANGED AIR COMPRESSORS SYSTEM

(75) Inventor: Yunjun Li, West Bloomfield, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 714 days.

(21) Appl. No.: 11/159,637

(22) Filed: Jun. 23, 2005

(65) Prior Publication Data

US 2006/0293816 A1 Dec. 28, 2006

(51) Int. Cl.
*B60G 17/018* (2006.01)

(52) U.S. Cl. ........................ 701/37; 701/38; 280/5.507; 280/5.504; 73/11.04; 180/337; 267/2

(58) Field of Classification Search ............. 701/36–38; 280/124.1, 5.507, 5.504; 123/556, 559.1; 244/117 R; 73/11.04; 180/337; 267/2
See application file for complete search history.

(56) References Cited

U.S. PATENT DOCUMENTS 3,509,959 A * 5/1970 Fitch et al. .................. 181/107
3,668,785 A * 6/1972 Rodwin ........................ 34/398
4,170,048 A * 10/1979 Anthony ........................ 4/321
4,286,342 A * 9/1981 Anthony ........................ 4/321
4,505,117 A * 3/1985 Matsuoka .................... 60/609
4,564,375 A * 1/1986 Munk et al. ................... 96/364
4,741,164 A * 5/1988 Slaughter ..................... 60/627
4,829,436 A 5/1989 Kowalik et al.
5,114,100 A * 5/1992 Rudolph et al. ......... 244/134 C
5,299,547 A * 4/1994 Michimasa .............. 123/559.1
5,465,209 A 11/1995 Sammut et al.
5,533,333 A * 7/1996 Pullar et al. .................... 60/327
5,876,526 A * 3/1999 Hamade et al. ............. 152/416
6,311,797 B1 * 11/2001 Hubbard ..................... 180/165
6,327,994 B1 * 12/2001 Labrador .................... 114/382
6,352,040 B1 * 3/2002 Voorhees et al. ............ 110/237
6,698,778 B2 3/2004 Roemer et al.
7,305,838 B2 * 12/2007 Fornof ........................... 62/93
7,320,316 B2 * 1/2008 Moncelle et al. ............ 123/572
2004/0065308 A1 * 4/2004 Bryant ....................... 123/562

(Continued)

FOREIGN PATENT DOCUMENTS

DE 10013660 A1 * 9/2001

(Continued)

OTHER PUBLICATIONS 3-vehicle health monitoring on the Docklands Light Railway; McDonald, M.; Richards, A.;; Advanced Condition Monitoring Systems for Railways, IEE Colloquium on, Oct. 4, 1995 pp. 4/1-4/6.*

(Continued)

*Primary Examiner*—Cuong H Nguyen

(57) ABSTRACT

A series arranged air compressors system includes a first air compressor and a second air compressor pneumatically connected in series in an open, closed or partially closed state of operation. The output of the second air compressor is used as a source of compressed air for an air suspension system of a motor vehicle and/or to pressurize air inflatable articles. Flow of compressed air is selectively controlled by an electronic control circuit via at least one air flow control block, and the system may further include one or more air reservoirs.

18 Claims, 6 Drawing Sheets

U.S. PATENT DOCUMENTS

| | | | | |
|---|---|---|---|---|
| 2005/0236792 | A1* | 10/2005 | Hedenberg | 280/124.11 |
| 2006/0127224 | A1* | 6/2006 | Sweet et al. | 417/32 |
| 2006/0196168 | A1* | 9/2006 | Seitz et al. | 60/278 |
| 2006/0218938 | A1* | 10/2006 | Fornof | 62/3.4 |
| 2006/0293816 | A1* | 12/2006 | Li | 701/38 |
| 2007/0107709 | A1* | 5/2007 | Moncelle et al. | 123/572 |
| 2008/0082218 | A1* | 4/2008 | Fornof | 700/299 |
| 2008/0292471 | A1* | 11/2008 | Sweet et al. | 417/32 |

FOREIGN PATENT DOCUMENTS

| | | | |
|---|---|---|---|
| GB | 2425972 | A * | 11/2006 |
| JP | 01070258 | A * | 3/1989 |
| JP | 01233151 | A * | 9/1989 |
| JP | 03025068 | A * | 2/1991 |
| JP | 08301100 | A * | 11/1996 |
| JP | 2005240579 | A * | 9/2005 |

OTHER PUBLICATIONS

Utility energy storage applications studies; Schoenung, S.M.; Burns, C.; Energy Conversion, IEEE Transaction on; vol. 11, Issue 3, Sep. 1996 pp. 658-665, Digital Object Identifier 10.1109/60.537039.*

Turning Segways into soccer robots; Searock, J.; Browning, B.; Veloso, M.; Intelligent Robots and Systems, 2004. (IROS 2004). Proceedings. 2004 IEEE/RSJ International Conference on, vol. 1, Sep. 28-Oct. 2, 2004 pp. 1029-1034 vol. 1 Digital Object Identifier 10.1109/IROS.2004.1389488.*

* cited by examiner

SERIES ARRANGED AIR COMPRESSORS SYSTEM

TECHNICAL FIELD

The present invention relates generally to air compressor systems and more particularly to a series arranged air compressors system for providing a source of high flow compressed air for motor vehicle suspension systems.

BACKGROUND OF THE INVENTION

Motor vehicle air suspension systems utilize compressed air operated leveling devices, as for example air springs and/or air controlled shock absorbers or a combination thereof, to provide ride and leveling control of the vehicle. Such air suspension systems utilize a single air compressor to provide a source of compressed air to the air operated leveling devices. In a typical configuration, as for example described in any of U.S. Pat. Nos. 4,829,436; 5,465,209 and 6,698,778, the air compressor is selectively connected, by electronically controlled solenoid valves, to the air operated leveling devices, a compressed air reservoir, an air intake, and an air exhaust. Most air suspension systems operate in an "open state" in the sense the excess pressure within the system is vented to the atmosphere at the exhaust and the source air for the compressor is drawn from the atmosphere at the intake; however, at least one air suspension system (see above-cited U.S. Pat. No. 6,698,778) operates in a "closed state" in the sense that air is not exchanged with the atmosphere, wherein excess pressure is stored in an air reservoir and the source air for the compressor is either the air reservoir or the air springs.

Turning attention now to FIG. 1, an example of a prior art motor vehicle suspension system 10 is depicted, as generally also shown and described in aforementioned U.S. Pat. No. 4,829,436 to Kowalik et al, issued on May 9, 1989 and assigned to the assignee hereof, the disclosure of which is hereby incorporated herein by reference.

The motor vehicle air suspension system 10 includes four leveling devices 12 which may be air springs and/or air operated shock absorbers, or a combination thereof, a computer 14, a compressor/exhaust apparatus 16, an air drier 18, a pressure switch 20, a valve assembly 22, a plurality of air lines 24 and signal lines 26. The plurality of air lines 24 go to the four leveling devices 12 to provide pressurized air from the valve assembly 22. A road wheel 28 is associated with each leveling device 22. The computer 14 receives an ignition signal, vehicle speed signal and vehicle door disposition signal. The computer 14 controls the operation of each solenoid valve in the valve assembly 22. The computer 14 also receives input from sensors in three of the four road wheels 28 through the three signal lines 26. The compressor/exhaust apparatus 16 selectively sources or vents air through the air drier 18. A master air line 30 runs from the pressure switch 20 to the valve assembly 22 which controls compressed air communication between the compressor/exhaust apparatus 16 and the individual leveling devices 12 in response to signals from the computer 14. The pressure switch 20 also provides a signal to the computer 14 when the air pressure to any leveling device falls below 35 psi so that incremented pressure is automatically provided to that leveling device.

What remains needed in the art is an improved flow rate source of compressed air for motor vehicle air suspension systems, wherein cost, weight, package size, heat, noise, run-time and power consumption are all minimized at the improved source of compressed air.

SUMMARY OF THE INVENTION

The present invention is a series arranged air compressors system for a motor vehicle air suspension system, wherein provided is an improved flow rate source of compressed air for the motor vehicle air suspension system, and wherein cost, weight, package size, heat, noise, run-time and power consumption are all minimized thereby. The series arranged air compressors system includes, inter alia, a first air compressor, a second air compressor pneumatically connected to the first air compressor, and an electronically controlled air flow control block which selectively provides an open, closed or partially closed state of the system whereby a source of compressed air is provided to leveling devices of the air suspension system.

In a preferred embodiment of the series arranged air compressors system, included are first and second air compressors, an air reservoir, an air intake/exhaust, a first air flow control block, and a second air flow control block, wherein the first and second air flow control blocks may be combined into a single block. The air reservoir is bi-directionally connected to the first air flow control block. The air intake/exhaust is bi-directionally connected to an input of the first air compressor and to the first air flow control block. The output of the first air compressor is connected to an input of the first air flow control block. The second air compressor is bi-directionally connected to the first air flow control block and to the second air flow control block. Excess air from air suspension leveling devices is either selectively vented through the intake/exhaust to the atmosphere or is selectively compressed at the air reservoir. The leveling devices (i.e., air springs, air actuated shock absorbers, combinations thereof, etc.) or air inflatable articles (i.e., tires, inflatable toys, pneumatic tools, etc.) are connected to the second air flow control block. An electronic control circuit is used to electronically control the series arranged air compressors system, which includes an electronic control module, switches, sensors and a display. The system may be operated in either a closed state or a partially closed state, wherein in the partially closed state, the system normally operates in a closed state except under predefined conditions where during the system operates in an open state.

Other alternative embodiments of the series arranged air compressors system interfaced to a motor vehicle air suspension system are possible, operating in open, closed and partially closed states.

Accordingly, it is an object of the present invention to provide a series arranged compressors system interfaced with a motor vehicle air suspension system, which provides minimization of cost, weight, package size, heat, noise, run-time and power consumption, as compared with a comparable output single air compressor system.

DESCRIPTION OF THE PREFERRED EMBODIMENT

Figure 1:
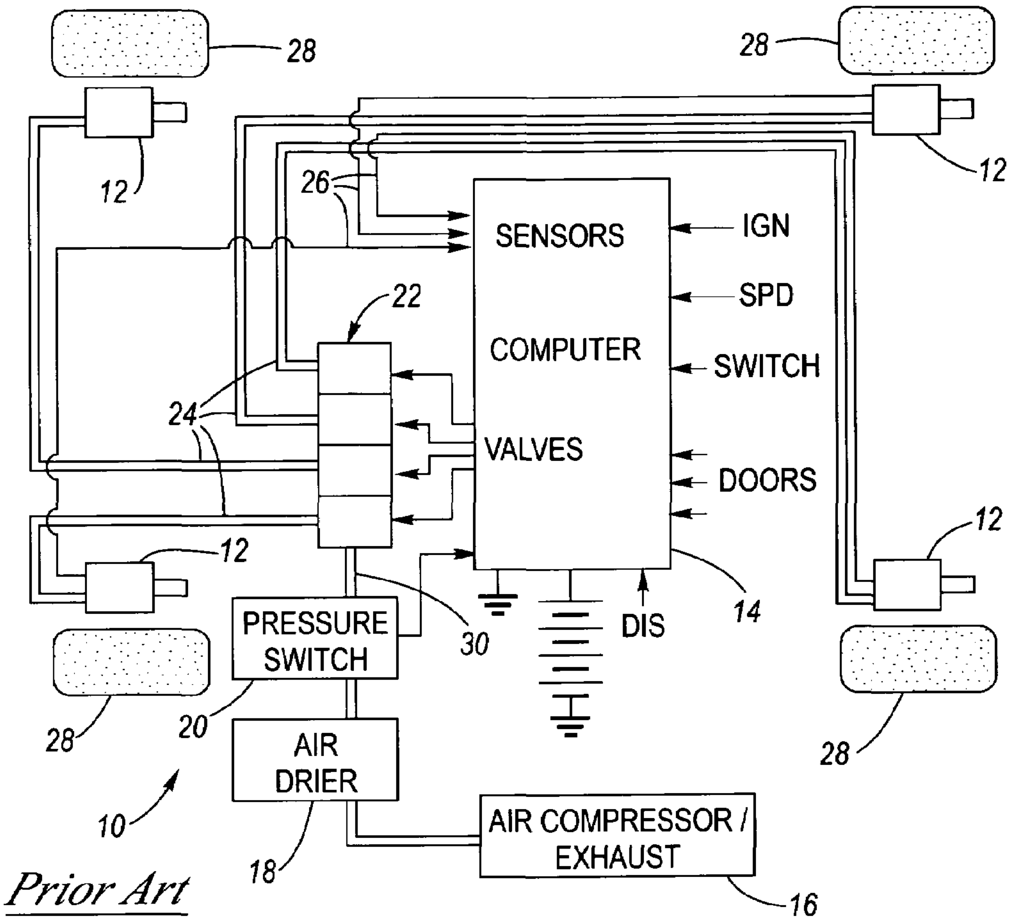
FIG. 1 is a schematic diagram of a prior art motor vehicle air suspension system.

Referring now to FIGS. 2 through 10, various aspects of a series air compressor system according to the present invention will be detailed, wherein operation thereof with respect to a motor vehicle air suspension system may be understood by analogized reference to the motor vehicle air suspension system 10 of FIG. 1.

Figure 2:
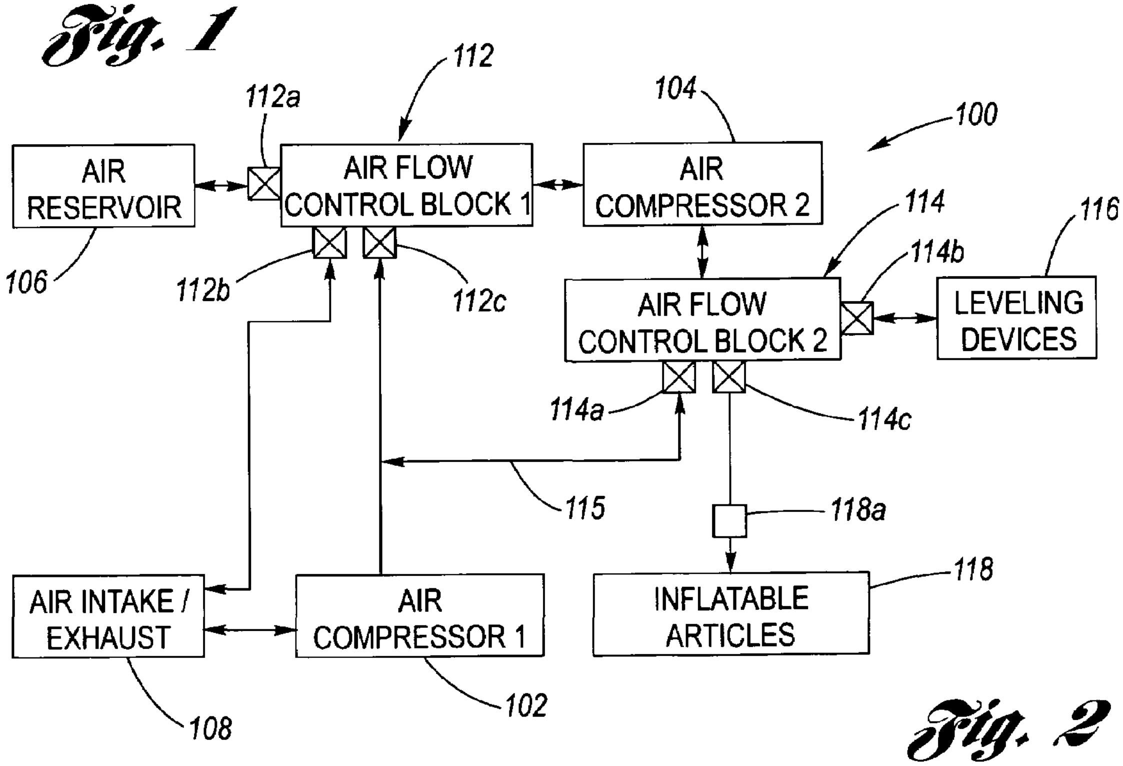
FIG. 2 is a block diagram of a preferred series arranged air compressors system for a motor vehicle suspension system.
Figure 3:
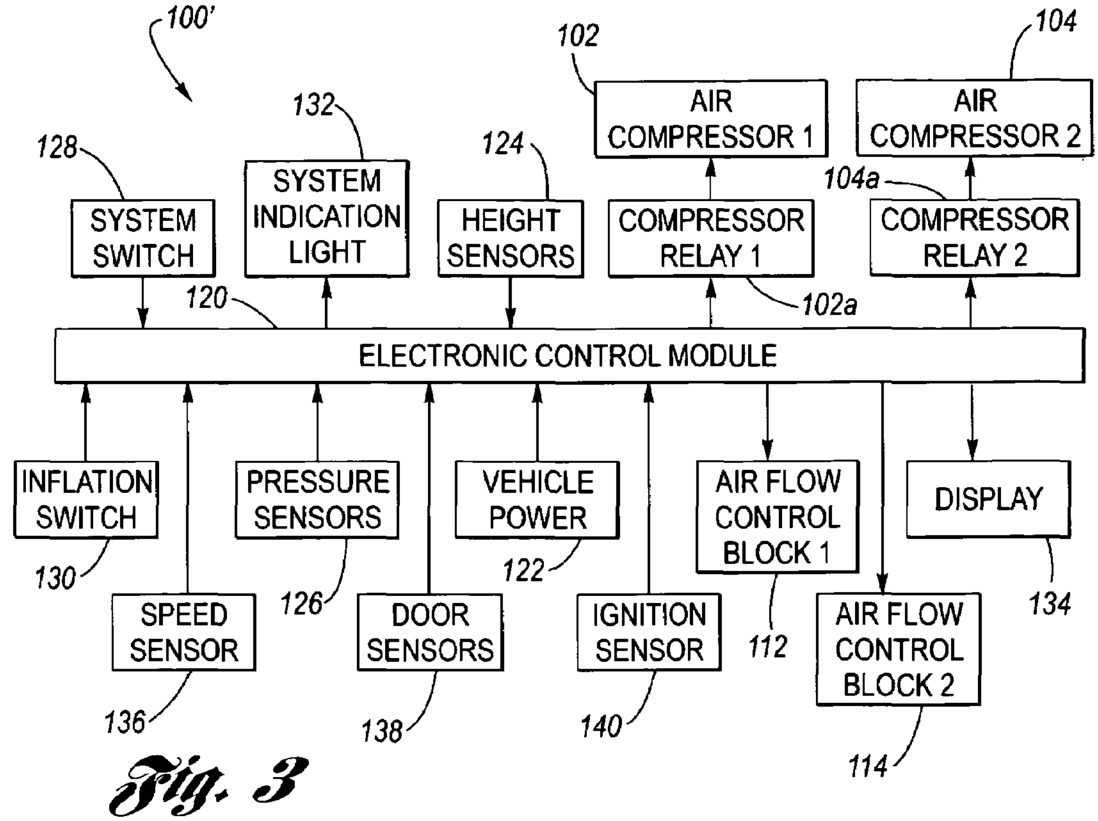
FIG. 3 is a block diagram of a control circuit of the preferred series arranged air compressors system for the motor vehicle suspension system of FIG. 2.

Referring now to FIGS. 2 and 3, FIG. 2 depicts the most preferred embodiment of the series arranged air compressors system 100, and FIG. 3 depicts a diagram of an electronic control circuit 100' for its operative implementation.

The series arranged air compressors system 100 includes a first air compressor 102, a second air compressor 104, an air reservoir 106, an air intake/exhaust 108, a first air flow control block 112, and a second air flow control block 114, wherein the first and second airflow control blocks may be integrated into a single air flow control block. The first and second air flow control blocks are manifolds which have internal paths to direct air flow, and connections which serve as selectively intercommunicating pneumatic inputs and/or outputs, and a group of solenoid valves/blocks. By way of exemplification, a conventional solenoid valve block forms part of an air compressor assembly, and the air flow control blocks as used herein could be air spring solenoid valves with a manifold which has internal paths to direct air flow.

The first air compressor 102 and the second air compressor 104 each constitute, respectively, a compressor assembly which includes an electric relay and may further include one or more internal or external dryers to prevent moisture in the air suspension system. The second air compressor 104 is a closed compressor, bi-directionally connected between first air flow control block 112 and second air flow control block 114, and the compressor assembly thereof may have internal or externally disposed reversing valves to provide selective direction of air flow with respect to the input port thereof.

The air reservoir 106 is bi-directionally connected to a first solenoid valve 112*a* of the first air flow control block 112. The air intake/exhaust 108 is bi-directionally connected to an input of the first air compressor 102 and bi-directionally connected a second solenoid valve 112*b* of the first air flow control block 112. The output of the first air compressor 102 is connected to a third solenoid valve 112*c* of the first air flow control block 112, and is also connected to a first solenoid valve 114*a* of second air flow control block 114 via an intercommunication air line 115. The second air compressor 104 is bi-directionally connected between the first air flow control block 112 and the second air flow control block 114, via air lines and pneumatic fittings with a quick connect feature. The initial source air for air reservoir 106 is from the first air compressor 102 through the third solenoid valve 112*c* and first solenoid valve 112*a* of first air flow control block 112. The first solenoid valve 112*a* of the first air flow control block 112 could alternatively be integrated into air reservoir 106 which is then connected to the first air flow control block via an air line.

In an operative environment, motor vehicle leveling devices 116 (i.e., air springs, air actuated shock absorbers, combinations thereof, etc. as shown at 12 in FIG. 1) are connected bi-directionally to a plurality of second solenoid valves 114*b* (one solenoid valve for each leveling device) of the second air flow control block 114. An inflation solenoid valve 114*c* of the second air flow control block 114 provides compressed air for inflatable articles 118 (i.e., tires (see 28 in FIG. 1), balls, water toys, air mattresses, pneumatic tools, etc.).

Source air is selectively compressed into the leveling devices 116 from the air reservoir 106 via the second air compressor 104 through the first solenoid valve 112*a* of first air flow control block 112, and the plurality of second solenoid valves 114*b* of second air flow control block 114. Excess air from leveling devices 116 is selectively stored in the air reservoir 106, via the plurality of second solenoid valves 114*b*, the second air compressor 104, and the first solenoid valve 112*a*, or is selectively vented at the air intake/exhaust 108 via the second solenoid valve 112*b* of the first air flow control block 112, the second air compressor 104, and the second air flow control block 114, or is vented at the air intake/exhaust 108 via the intercommunication air line 115. Alternatively, each leveling device 116 may carry its respective second solenoid valve 114*b* which may have the advantage of better leak protection, which is, in turn, connected to the second air flow control block 114 via air lines.

The series arranged air compressors system 100 may be operated in either a closed state in which air is not exchanged with the atmosphere during operation or a partially closed state in which the system normally operates in a closed state except under predefined conditions (as for example if an over pressure condition arises) whereduring the system operates in an open state in which air is exchanged with the atmosphere during operation at the air intake/exhaust 108.

The electronic control circuit 100' is used to electronically control the series arranged air compressors system 100. An electronic control module 120 is electronically interfaced with: the first air compressor 102 via a first compressor relay 102*a*; the second air compressor 104 via a second compressor relay 104*a*; the solenoid valves 112*a*-112*c* of the first air flow control block 112; the solenoid valves 114*a*-114*c*, of the second air flow control block 114; a source of electrical power 122 from the motor vehicle; various sensors including height sensors 124 and pressure sensor(s) 126, as well as other sensors such as doors open/close sensors 138, an ignition on/off sensor 140, vehicle speed sensor 136, etc.; switches including a system master switch 128 and an inflation switch 130; and indicators including a system condition indication light 132 and a system information display 134.

In operation, the first air compressor 102 is only used when the system 100 initially pressurizes, re-pressurizes or during inflation of the air inflatable articles 118. With respect to inflation of the inflatable articles, an inflation kit 118*a* is preferably provided which includes a flexible hose connected to the third air solenoid valve 114*c*, an assortment of valve tips, and preferably also a pressure gauge, wherein operation of the third solenoid valve is controlled by the inflation switch 130. The air reservoir 106 stores compressed air. The leveling devices 116 are selectively provided with predetermined air pressure or trim height which is adjusted via the plurality of second solenoid valves 114*b*, analogously to the valve block 22, via programming of the electronic control module 120, wherein air is selectively bi-directionally passed from the leveling devices 116 to the air reservoir 106 by selective operation of the first and second air flow control blocks 112, 114 and the second air compressor 104, or selectively exhausted at the air intake/exhaust 108 when system pressure is higher than predefined pressure, or selectively pressurized by the second air compressor 104 via the air intake/exhaust 108 or via operation of the first air compressor 102 when system pressure is lower than predefined pressure.

In operation, the electronic control module 120 could turn on or off the first compressor relay 102*a* to selectively and independently run the first air compressor 102 or the second compressor relay 104*a* to selectively and independently run the second compressor 104 to maintain trim height if one of the air compressors fails. For example, if the first air compressor 102 fails, then the second air compressor will compress air between the air reservoir 106 and the leveling devices 116. The second air compressor 104 will also take air from the air intake/exhaust 108 to the air reservoir 106 if the system pressure is lower than a predefined pressure, or vent air to air intake/exhaust 108 if the system pressure is higher than a predefined pressure. During this time, the system is in a partially closed state. If the second air compressor 104 fails, the first air compressor 102 will fill the air reservoir 106 to a predefined high pressure, then use the pressure difference between the air reservoir 106 and the leveling devices 116 to fill the leveling devices to raise trim height, wherein excess air will be vented to the atmosphere via the air intake/exhaust 108 to lower trim height. During this time the system is in an open state.

With respect to automatic operation in an air suspension system of a motor vehicle, load leveling is regulated via the height sensors 124 sensing vehicle trim height change of the leveling devices 116, whereupon the electronic control module 120 turns on or off the appropriate compressor relay(s) 102*a*, 104*a* to run the respective air compressor(s) 102, 104, and switches on or off appropriate solenoid valves of the air flow control blocks 112, 114 to provide the leveling devices with an appropriate air pressure and/or vehicle trim height according to programming of the electronic control module.

With respect to manual operation in an air suspension system of a motor vehicle, when an operator pushes the system switch 128 to change trim height, the electronic control module 120 turns on or off the appropriate compressor relay (s) 102*a*, 104*a* to run the respective air compressor(s) 102, 104, and switches on or off appropriate solenoid valves of the air flow control blocks 112, 114 to provide the leveling devices with an appropriate air pressure and/or trim height, whereupon the system indication light 132 will indicate the trim height.

Per programming of the electronic control module 120, when vehicle wheel speed changes, the leveling devices 116 trim height can be changed for improved fuel economy, off-road, rough road, highway, passenger(s) ease of entry/exit with respect to the vehicle, etc. In this regard, the electronic control module 120 turns on or off the appropriate compressor relay(s) 102*a*, 104*a* to run the respective air compressor(s) 102, 104, and switches on or off appropriate solenoid valves of the air flow control blocks 112, 114 to provide the leveling devices with an appropriate air pressure and/or trim height, and if so programmed, may illuminate the system indication light 132 to indicate the trim height.

In the event of a system failure, the electronic control module 120 may be programmed that if a component fails, the electronic control module will turn the system off, and/or switch to a preprogrammed fail-safe mode; or should the electronic control module itself fail, then the system will lock itself into a predetermined mode which is predetermined to be operationally sans the electronic control module.

With respect to inflation of the inflatable articles 118, when the inflation switch 130 is activated, the electronic control module 120, according to programming, turns on the compressor relays 102*a*, 104*a* to run the first and second compressors 102, 104. The air dryer(s) is bypassed during inflation. The above mentioned inflation kit 118*a* will be used to provide a user selectable air path to the inflatable articles, and inflation will be shut off automatically after elapse of a predefined time, or when vehicle speed is above a predefined speed.

With respect to motor vehicle load sensing, when the system is on, the electronic control module 120 uses the pressure sensor(s) 126 input to monitor air pressure in each leveling device. If programming determines the motor vehicle is overloaded, then the electronic control module 120 will send a message to the display 134 to inform the operator that the motor vehicle is overloaded, or that the load is offset to one side of the vehicle.

With respect to tire pressure sensing, if the motor vehicle uses multiple tire pressures under different loading conditions and the electronic control module 120 determines, according to data from the pressure sensor(s) 126 and programming, that pressure within the leveling devices 116 is over a predefined limit, then a message is sent to the display 134 to remind the operator that he/she needs to change the tire pressure for better ride and handling via the third solenoid valve 114*c* and its associated inflation kit 118*a*.

A number of advantages of the series arranged air compressors system 100, is provided, including:

reduction of power consumption due to two smaller air compressors, wherein the piston and piston stroke in each would be smaller than a comparable output single air compressor;

reduction of compressor noise, both structural and air borne, as piston pressure differentials are smaller than with a comparable output single air compressor;

net cost savings over a comparable output single air compressor due to larger production volume, less lubrication, materials, durability life of the parts, etc., even when considering that two air compressors are now used;

faster system response time to inflation demands of either or both the leveling devices and the inflatable articles, wherein the output airflow rate is much higher than a comparable output single air compressor because air input into the second air compressor is pre-compressed by the first air compressor;

air compressor total run time and long term durability are better than for a comparable single piston air compressor due to piston pressure differentials being smaller, the air compressors are selectively run for air suspension and inflation, and better managed;

better heat management in that the smaller piston stroke generates less heat than a comparable output single air compressor, and also in inflation mode to inflate large inflatable articles, such as four flat/low pressure tires, air mattress, the air compressors are better controlled per programming;

smaller packaging space can be provided in certain applications, as for example a fast inflation response time can be provided by two series arranged air compressors without utilization of an air reservoir;

the second air compressor compresses the pre-compressed air from the first air compressor, resulting in an output air flow rate at higher air pressure from the second air compressor that is much higher than that of a comparable single air compressor system;

the size of the first and second air compressors is reduced in relation to a comparable output single air compressor, wherein benefits include reduced power consumption, lower running noise, and longer durability life; and all the components of the series arranged air compressors system have commercial availability.

Turning attention now to FIGS. 4 through 10, alternative embodiments of the series arranged compressors system according to the present invention will be discussed.

Figure 4:
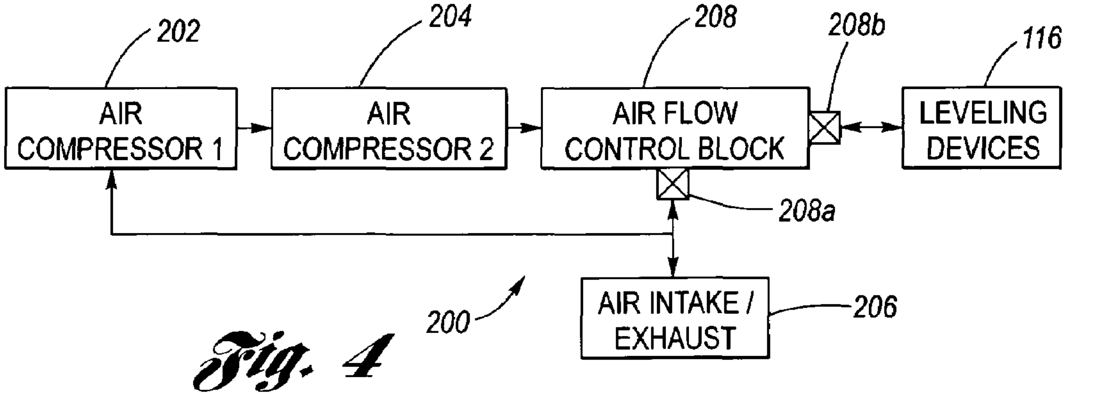
FIG. 4 is a block diagram of a second embodiment of a series arranged air compressors system for a motor vehicle suspension system.

FIG. 4 depicts a second embodiment of the series arranged air compressors system 200. Included are first and second air compressors 202, 204 which may include internal or external air dryer(s), an air intake/exhaust 206, and an air flow control block 208. The air intake/exhaust 206 is bi-directionally connected to a first solenoid valve 208*a* of the air flow control block 208. The input of the second air compressor 204 is connected to the output of the first air compressor 202. The input of the first air compressor 202 is connected to the air intake/exhaust 206. The output of the second air compressor 204 is connected to a pneumatic fitting (with quick connect feature) of the air flow control block 208. Excess air is selectively vented via the first solenoid valve 208*a* through the air intake/exhaust 206. Leveling devices 116 of an air suspension system, as discussed hereinabove, are bi-directionally connected to a plurality of second solenoid valves 208*b* (one for each leveling device) of the air flow control block 208.

A control circuit, appropriately adapted from that of FIG. 3, is used to electronically control the series arranged air compressors system 200, which includes an electronic control module, switches, sensors and a display as mentioned hereinabove. The system is operated in an open state.

Figure 5A:
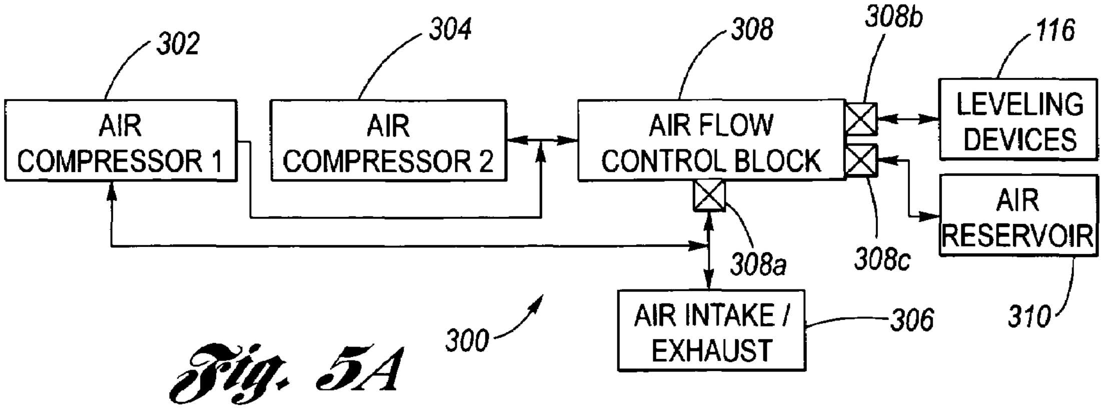
FIG. 5A is a block diagram of a third embodiment of a series arranged air compressors system for a motor vehicle suspension system.
Figure 5B:
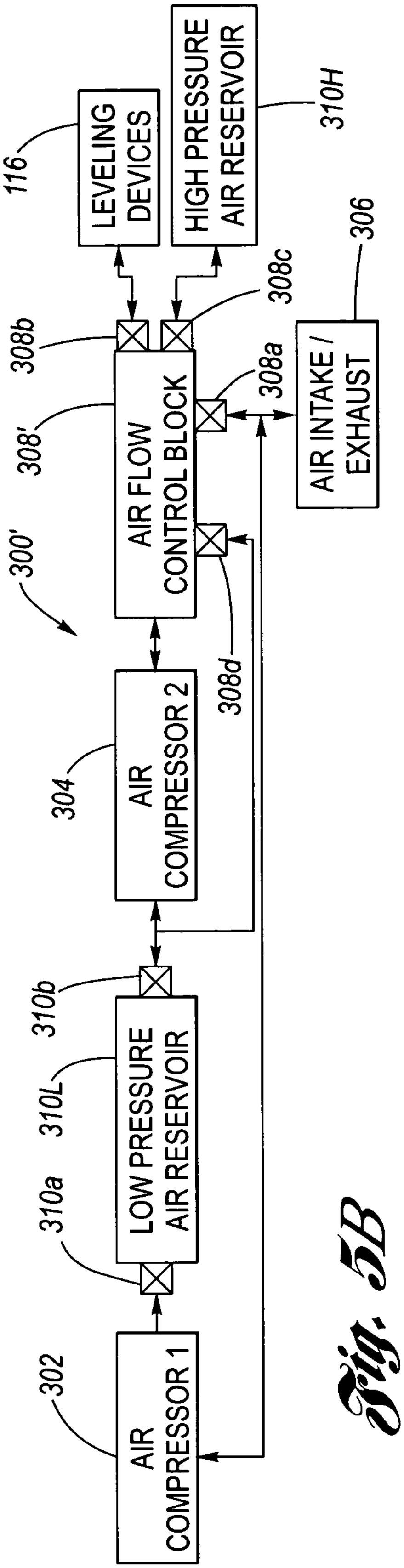
FIG. 5B is a block diagram of a variation of the third embodiment of a series arranged air compressors system for a motor vehicle suspension system.
Figure 5C:
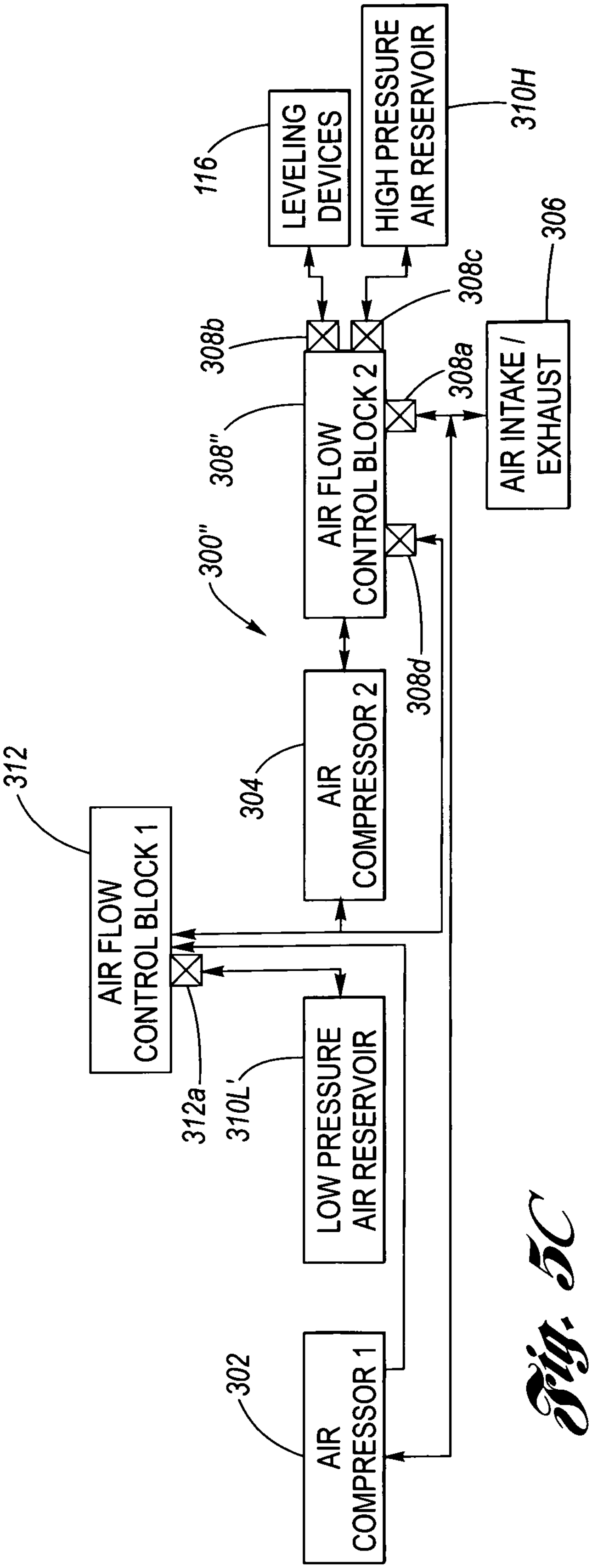
FIG. 5C is a block diagram generally as in FIG. 5B, now with the inclusion of a third air flow control block.

FIGS. 5A, 5B, and 5C depict a third embodiment of the series arranged compressors system 300, 300', 300", where besides first and second air compressors 302, 304 which may include internal or external air drier(s), and internal or external reversing valves for the second air compressor 304, an air intake/exhaust 306, and an air flow control block 308, 308', is now included an air reservoir 310 (FIG. 5A) or a high pressure air reservoir 310H and a low pressure air reservoir 310L (FIG. 5B), 118. In the configuration of FIG. 5C is the configuration is generally similar to that of FIG. 5B, but now including a second air flow control block.

The air intake/exhaust 306 is bi-directionally connected to a first solenoid valve 308*a* of the air flow control block 308, 308'. The input of the first air compressor 302 is connected to the air intake/exhaust 306. The second air compressor 304 is bi-directionally connected to the air flow control block 308, 308'. Leveling devices 116 of an air suspension system, as discussed hereinabove, are bi-directionally connected to a plurality of second solenoid valves 308*b* (one for each leveling device) of the air flow control block 308, 308'. In the version of FIG. 5A the air reservoir 310 is bi-directionally connected to the air flow control block 308 at a third solenoid valve 308*c*, and in the version of FIG. 5B, the high pressure air reservoir 310H is bi-directionally connected to air flow control block 308' at the third solenoid valve 308*c*. The input of the second air compressor 304 is connected to the output of the first air compressor 302, and is also bi-directionally connected to the air reservoir 310 and the leveling devices 116 via the air flow control block 308 in the version of FIG. 5A; and in the version of FIG. 5B, the low pressure reservoir 310L is connected, via a solenoid valve 310*a*, to the output of the first air compressor 302 and bi-directionally connected to the second air compressor 304, via a solenoid valve 310*b* are connected to the low pressure reservoir 310L; and there is an additional connection to a fourth solenoid valve 308*d* of the air flow control block 308'.

Excess air from the leveling devices 116, in the version of FIG. 5A, is delivered selectively to the air reservoir 310 via the air flow control block 308 and the second air compressor 304; or, in the version of FIG. 5B, delivered selectively to the high and/or low pressure air reservoirs 310H, 310L via the air flow control block 308' and the second air compressor 304, or is selectively vented via the first air flow control block 308, 308' at the air intake/exhaust 306 when system pressure is higher than a predefined pressure. The source of compressed air to the leveling devices 116 is selectively from air reservoir 310 via the air flow control block 308, and the second air compressor 304 (FIG. 5A); or, from high pressure reservoir 310H via the air flow control block 308' and the second air compressor 304 (FIG. 5B). The first air compressor 302 will compress air to the air reservoir 310 or to the low pressure air reservoir 310L when system pressure is lower than a predefined pressure.

In FIG. 5A, if the first air compressor 302 fails, the second air compressor 304 will then compress air between the air reservoir 310 and the leveling devices 116. In this regard, the second air compressor 304 compresses air from the air intake/exhaust 306 to the air reservoir 310 via the air flow control block 308 if system pressure is lower than a predefined pressure, and will vent air at the air intake/exhaust 306 if system pressure is higher than a predefined pressure. Now, the system is in a partially closed state. If second air compressor 304 fails, the first air compressor 302 will compress air into the air reservoir 310 via the air flow control block 308 to a predefined high pressure, and air will flow to the leveling devices 116 to raise trim height by the air pressure difference between the air reservoir 310 and the leveling devices. Excess air from the leveling devices is vented to the atmosphere via the air flow control block 308 and the air intake/exhaust 306. Now, the system is in an open state.

In FIG. 5B, if the first air compressor 302 fails, the second air compressor 304 will then compress air between the high pressure air reservoir 310H and the leveling devices 116, and also between the high pressure reservoir 310H and the low pressure air reservoir 310L via the air flow control block 308'. The second air compressor 304 also compresses air from the air intake/exhaust 306 to the high pressure reservoir 310H via the air flow control block 308' when system pressure is lower than a predefined limit. Now, the system is in a partially closed state. If the second air compressor 304 fails, the first air compressor 302 will then fill the low pressure air reservoir 310L to a predefined high pressure air, and air from low pressure air reservoir 310L will flow to the leveling devices 116 via the air flow control block 308' (i.e., the second solenoid valves 308*b* and the fourth solenoid valve 308*d*) by the air pressure difference between the low pressure air reservoir

310L and the leveling devices 116. Excess air from the leveling devices 116 will vent to the atmosphere via the air flow control block 308' and the air intake/exhaust 306. Now, the system is in an open state.

FIG. 5C shows a series arranged air compressors system 300" which operates similarly to that described with respect to FIG. 5B, wherein like parts retain like numbering, where now a first air flow control block 312 is added, and the above described air flow control block 308' is now a second air flow control block 308". In this regard, the first air flow control block 312 is bi-directionally connected to the low pressure air reservoir 310L' via a solenoid valve 312*a*, and is further bi-directionally connected to the second air compressor 304, and yet further bi-directionally connected to the second air flow control block 308" via the fourth solenoid valve 308*d* thereof.

A control circuit, appropriately adapted from that of FIG. 3, is used to electronically control the series arranged air compressors system 300, 300', 300", which includes an electronic control module, switches, sensors and a display as mentioned hereinabove. The system is operated in a closed or partially closed state.

Figure 6A:
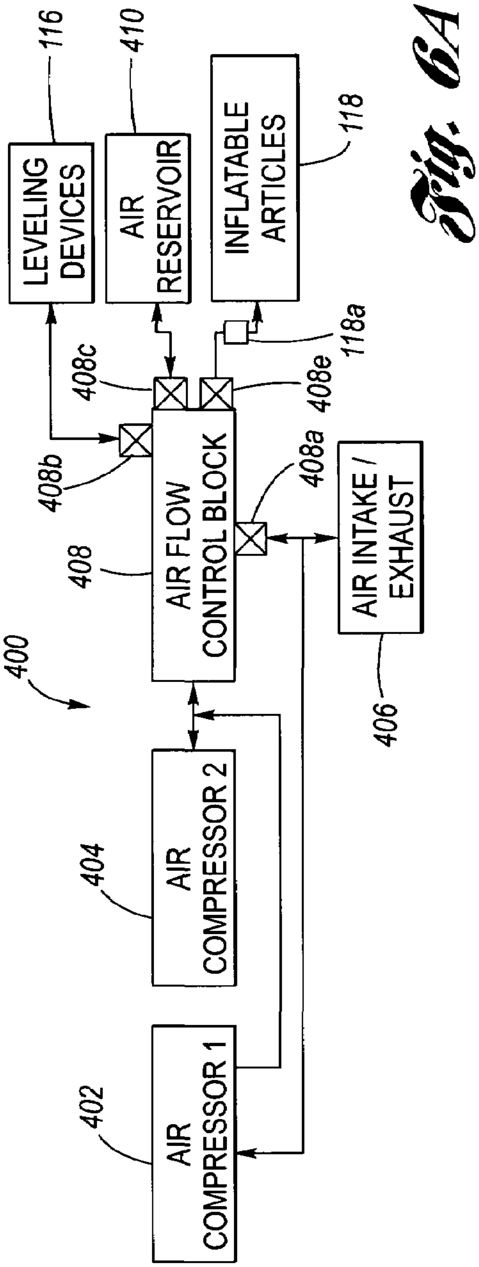
FIG. 6A is a block diagram of a fourth embodiment of a series arranged air compressors system for a motor vehicle suspension system.
Figure 6B:
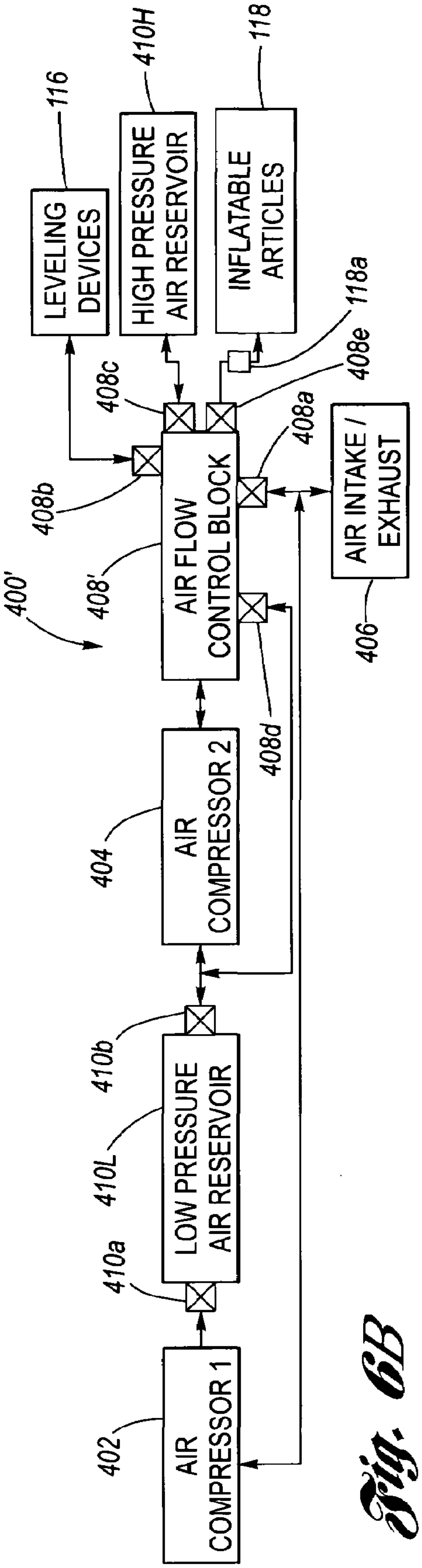
FIG. 6B is a block diagram of a variation of the fourth embodiment of a series arranged air compressors system for a motor vehicle suspension system.
Figure 6C:
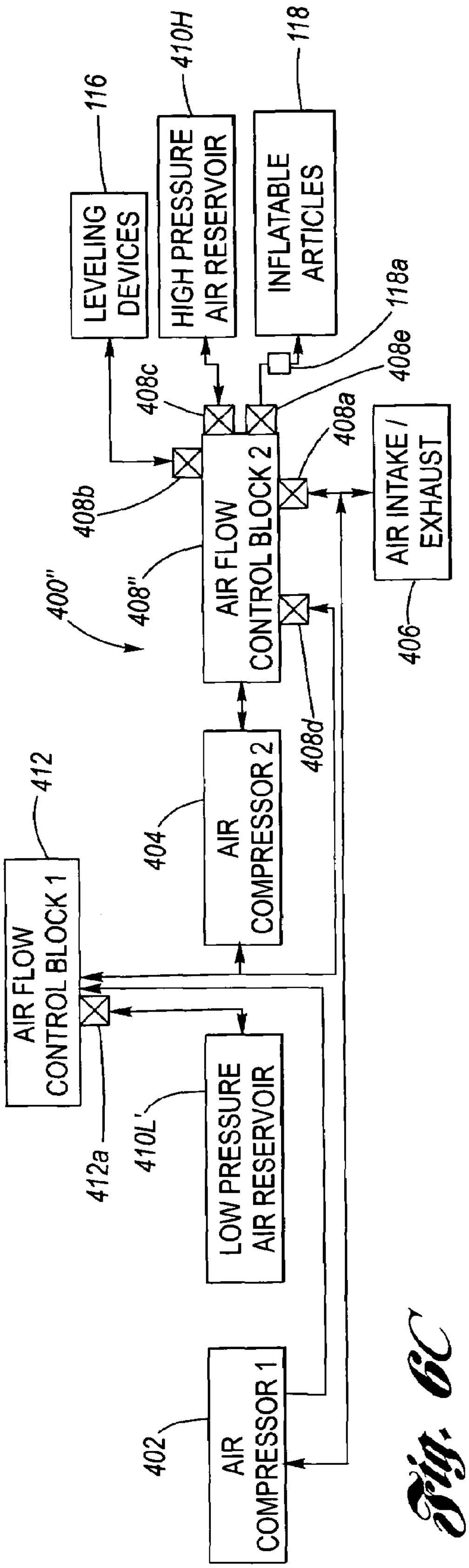
FIG. 6C is a block diagram generally as in FIG. 6B, now with the inclusion of a third air flow control block.

FIGS. 6A, 6B and 6C depict a fourth embodiment of the series arranged compressors system 400, 400', 400", where, besides first and second air compressors 402, 404 which include internal or external drier(s), and internal or external reversing valves for the second air compressor 404, an air intake/exhaust 406, and an air flow control block 408, 408', an air reservoir 410 (FIG. 6A) or a high pressure air reservoir 410H and a low pressure air reservoir 410L (FIG. 6B), is now an interconnection of the air flow control block for inflatable articles 118. In the configuration of FIG. 6C is the configuration is generally similar to that of FIG. 6B, but now including a second air flow control block.

The air intake/exhaust 406 is bi-directionally connected to a first solenoid valve 408*a* of the air flow control block 408, 408'. The input of the first air compressor 402 is connected to the air intake/exhaust 406. The second air compressor 404 is bi-directionally connected to the air flow control block 408, 408'. Leveling devices 116 of an air suspension system, as discussed hereinabove, are bi-directionally connected to a plurality of second solenoid valves 408*b* (one for each leveling device) of the air flow control block 408, 408'. In the version of FIG. 6A, the air reservoir 410 is bi-directionally connected to the air flow control block 408 via a third solenoid valve 408*c*, and in the version of FIG. 6B, the high pressure air reservoir 410H is bi-directionally connected to the air flow control block 408' via the third solenoid valve 408*c*. The input of the second air compressor 404 is connected to the output of the first air compressor 402 in the version of FIG. 6A; and in the version of FIG. 6B, the low pressure reservoir 410L is connected, via a solenoid valve 410*a*, to the output of the first air compressor 402, and is bi-directionally connected to the second compressor 404, via a solenoid valve 410*b*; and there is an additional connection to a fourth solenoid valve 408*d* of the air flow control block 408'. Inflatable articles 118, as discussed hereinabove, are connected to an inflation solenoid valve 408*e* of the air flow control block 408, 408', advantageously via an inflation kit 118*a*, as discussed hereinabove.

Excess air from the leveling devices 116, in the version of FIG. 6A, is delivered selectively to the air reservoir 410 via the air flow control block 408 and the second air compressor 408, or, in the version of FIG. 6B, to the high and/or low pressure air reservoirs 410H, 410L via the air flow control block 408' and the second air compressor 404, or selectively vented via the air flow control block 408, 408' through the air intake/exhaust 406 when system pressure is higher than a predefined pressure. The source air to the leveling devices 116 is selectively derived from air reservoir 410 via the air flow control block 408 and the second air compressor 404 (FIG. 6A), or from the high pressure reservoir 410H via the air flow control block 408' and the second air compressor 404 (FIG. 6B). The first compressor 402 will compress air to the air reservoir 410 or to the low pressure air reservoir 410L when system pressure is lower than a predefined pressure.

In FIG. 6A, if the first air compressor 402 fails, then the second air compressor 404 will compress air between the air reservoir 410 and the leveling devices 116. In this regard, the second air compressor 404 will compress air from the air intake/exhaust 406 to the air reservoir 410 if system pressure is lower than a predefined pressure, and vent air to the air intake/exhaust 406 if system pressure is higher than a predefined pressure. Now, the system is in a partially closed state. If second compressor 404 fails, then the first compressor 402 will compress air to the air reservoir 410 up to a predefined high pressure, and air will flow to the leveling devices 116 to raise trim height by the air pressure difference between the air reservoir 410 and the leveling devices 116. Excess air from the leveling devices is vented to the atmosphere via the air flow control block 408 and the air intake/exhaust 406. Now the system is in an open state.

In FIG. 6B, if the first air compressor 402 fails, then the second air compressor 404 will compress air between the high pressure air reservoir 410H and the leveling devices 116. In this regard, the second air compressor 404 will input air from the air intake/exhaust 406 when system pressure is lower than a predefined limit, and vent air to the air intake/exhaust if system pressure is higher than a predefined pressure. Now, the system is in a partially closed state. If the second air compressor 404 fails, then the first air compressor 402 will fill the low pressure reservoir 410L to a high pressure, and air from the low pressure air reservoir 410L will flow to the leveling devices by the air pressure difference between the low pressure air reservoir 410L and the leveling devices 116 via the fourth solenoid valve 408*d* and the second solenoid valves 408*b* of the air flow control block 408'. Excess air from the leveling devices 116 will vent to atmosphere via the air flow control block 408' and the air intake/exhaust 406. Now the system is in an open state.

With respect to inflation of the inflatable articles 118, both the first air compressor 402 and the second air compressor 404 operate to fill the inflatable articles, and bypassed are any air drier(s).

FIG. 6C shows a series arranged air compressors system 400" which operates similarly to that described with respect to FIG. 6B, wherein like parts retain like numbering, where now a first air flow control block 412 is added, and the above described air flow control block 408' is now a second air flow control block 408". In this regard, the first air flow control block 412 is bi-directionally connected to the low pressure air reservoir 410L' via a solenoid valve 412*a*, and is further bi-directionally connected to the second air compressor 404, and yet further bi-directionally connected to the second air flow control block 408" via the fourth solenoid valve 408*d* thereof.

A control circuit, appropriately adapted from that of FIG. 3, is used to electronically control the series arranged air compressors system 400, 400', 400", which includes an electronic control module, switches, sensors and a display as mentioned hereinabove. The system is operated in a closed or partially closed state.

Figure 7:
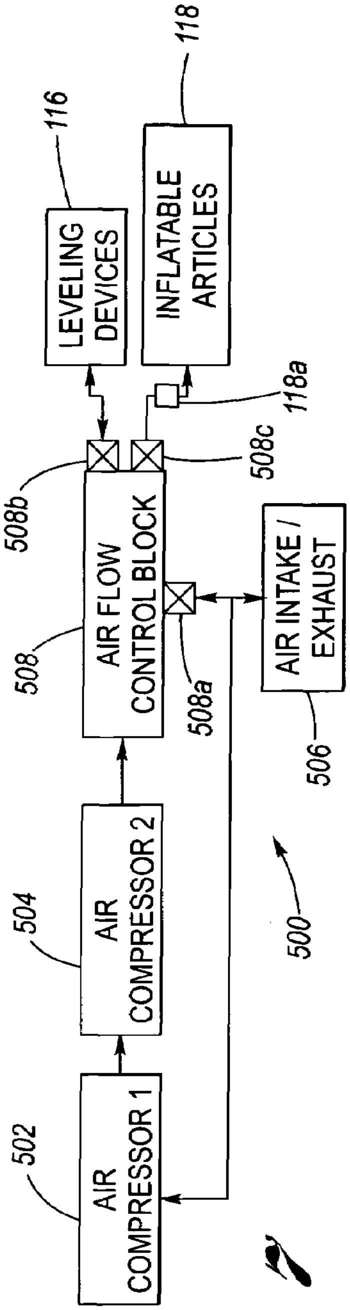
FIG. 7 is a block diagram of a fifth embodiment of a series arranged air compressors system for a motor vehicle suspension system.

FIG. 7 depicts a fifth embodiment of the series arranged compressors system 500 which is similar to FIG. 4, but now includes an interconnection of the air flow control block for inflatable articles 118.

Included are first and second air compressors 502, 504 which include internal or external air drier(s), an air intake/exhaust 506, and an air flow control block 508. The air intake/exhaust 506 is bi-directionally connected to a first solenoid valve 508*a* of the air flow control block 508. The input of the second air compressor 504 is connected to the output of the first air compressor 502. The input of the first air compressor 502 is connected to the air intake/exhaust 506. The output of the second air compressor 504 is connected to the air flow control block 508. Excess air is selectively vented via the first solenoid valve 508*a* through the air intake/exhaust 506. Leveling devices 116 of an air suspension system, as discussed hereinabove, are bi-directionally connected to a plurality of second solenoid valves 508*b* (one for each leveling device) of the air flow control block 508. Inflatable articles 118, as discussed hereinabove, are connected to an inflation solenoid valve 508*c* of the air flow control block 508, advantageously via an inflation kit 118*a*, as discussed hereinabove.

A control circuit, appropriately adapted from that of FIG. 3, is used to electronically control the series arranged air compressors system 500, which includes an electronic control module, switches, sensors and a display as mentioned hereinabove. The system is operated in an open state.

Figure 8:
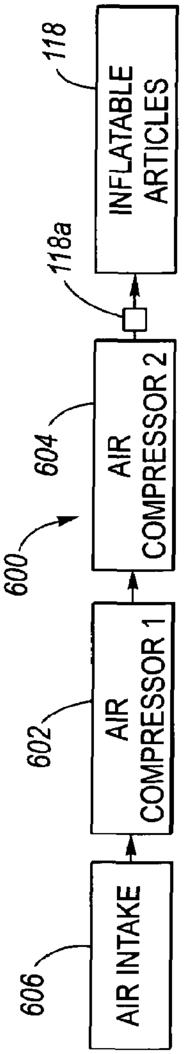
FIG. 8 is a block diagram of a sixth embodiment of a series arranged air compressors system.

FIG. 8 depicts a sixth embodiment of the series arranged compressors system 600 which is used simply for inflating inflatable articles 118. Included are first and second air compressors 602, 604, and an air intake 606. The air intake 606 is connected to the input of the first compressor 602. The output of the first air compressor 602 is connected to the intake of the second air compressor 604. The output of the second air compressor 604 is connected to the inflatable articles 118, as discussed hereinabove, advantageously via an inflation kit 118*a*, as also discussed hereinabove.

A control circuit, appropriately adapted from that of FIG. 3, is used to electronically control the series arranged air compressors system 600, which includes an electronic control module, switches, and selected sensors, and may include an appropriate display indicating gauge pressure, etc. The system is operated in an open state.

Figure 9:
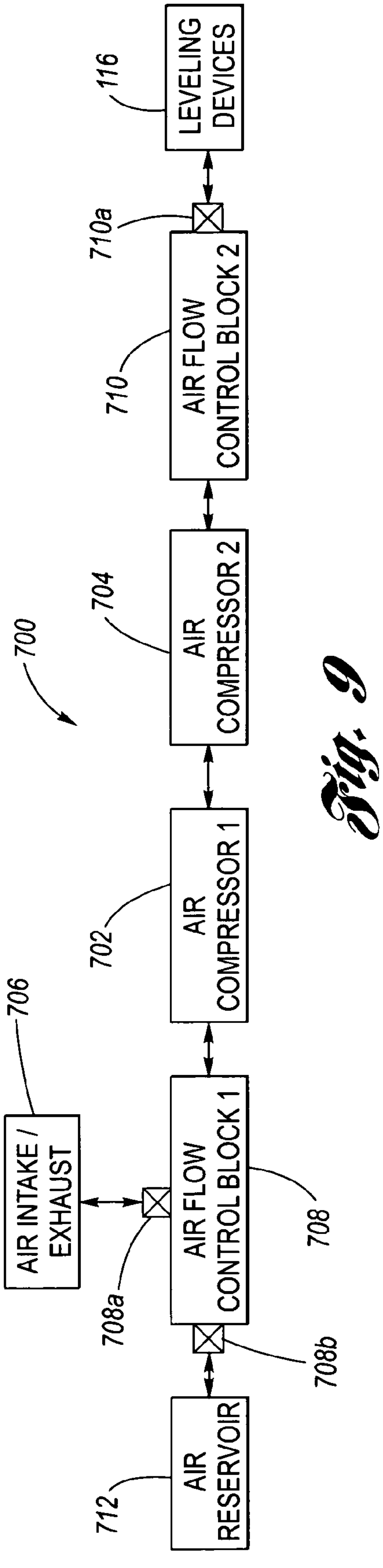
FIG. 9 is a block diagram of a seventh embodiment of a series arranged air compressors system for a motor vehicle suspension system.

FIG. 9 depicts a seventh embodiment of the series arranged compressors system 700. Included are first and second air compressors 702, 704 which also include internal or external air drier(s) and internal or external reversing valves, an air intake/exhaust 706, a first air flow control block 708, a second air flow control block 710, and an air reservoir 712.

The air intake/exhaust 706 is bi-directionally connected to a first solenoid valve 708*a* of the first air flow control block 708. The air reservoir 712 is bi-directionally connected to a second solenoid valve 708*b* of the first air flow control block 708. The first air compressor 702 is bi-directionally connected to the first air flow control block 708. The first compressor 702 is bi-directionally connected to the second air compressor 704. The output of the second air compressor 704 is bi-directionally connected to the second air flow control block 710. Leveling devices 116 of an air suspension system, as discussed hereinabove, are bi-directionally connected to a plurality of first solenoid valves 710*a* (one for each leveling device) of the second air flow control block 710. Air is compressed between the air reservoir 712 and the leveling devices 116 by the first air compressor 702 and the second air compressor 704 via the first and second air flow control blocks 708, 710. Excess air is selectively vented via the first solenoid valve 708*a* of the first air flow control block 708 to the air intake/exhaust 706 for a partially closed state of operation.

A control circuit, appropriately adapted from that of FIG. 3, is used to electronically control the series arranged air compressors system 700, which includes an electronic control module, switches, sensors and a display as mentioned hereinabove. The system is operated in a closed or partially closed state.

Figure 10:
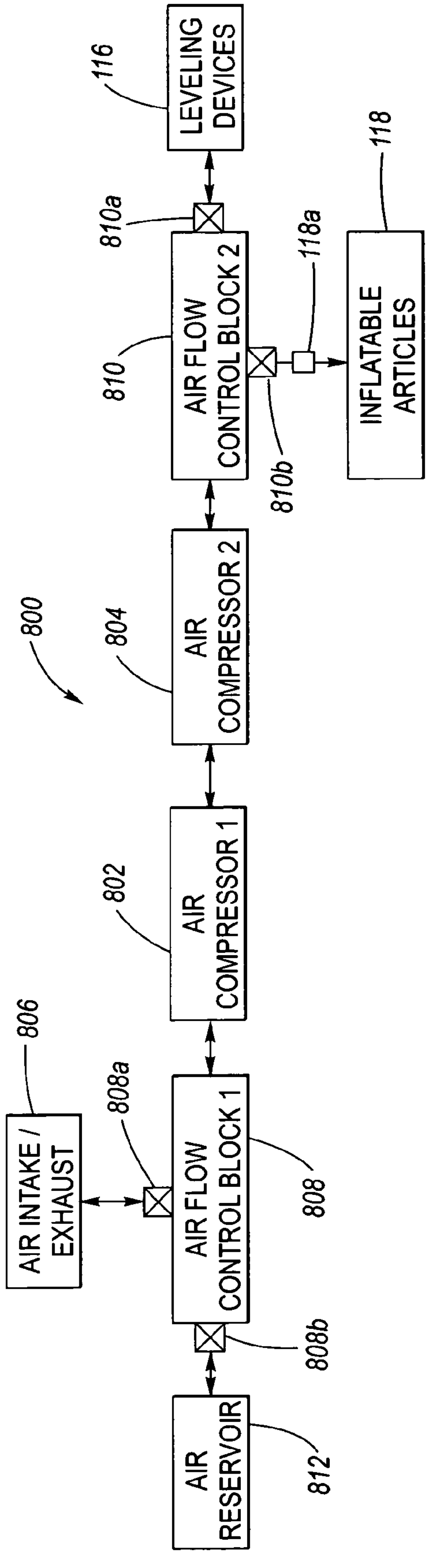
FIG. 10 is a block diagram of an eighth embodiment of a series arranged air compressors system for a motor vehicle suspension system.

FIG. 10 depicts an eighth embodiment of the series arranged compressors system 800 that is similar to FIG. 9, but now includes an interconnection for inflatable articles 118. Included are first and second air compressors 802, 804 which include internal or external air drier(s) and internal or external reversing valves, an air intake/exhaust 806, a first air flow control block 808, a second air flow control block 810, and an air reservoir 812.

The air intake/exhaust 806 is bi-directionally connected to a first solenoid valve 808*a* of the first air flow control block 808. The air reservoir 812 is bi-directionally connected to a second solenoid valve 808*b* of the first air flow control block 808. The first air compressor 802 is bi-directionally connected to the first air flow control block 808. The first compressor 802 is bi-directionally connected to the second air compressor 804. The second air compressor 804 is bi-directionally connected to the second air flow control block 810. Leveling devices 116 of an air suspension system, as discussed hereinabove, are bi-directionally connected to a plurality of first solenoid valves 810*a* (one for each leveling device) of the second air flow control block 810. Air is compressed between the air reservoir 812 and the leveling devices 116 by the first and second air compressors 802, 804, via the first and second air flow control blocks 808, 810. Excess air from the air suspension system is selectively vented via the first solenoid valve 808*a* of the first air flow control block 808 to the air intake/exhaust 806 for a partially closed state of operation.

Inflatable articles 118, as discussed hereinabove, are connected to an inflation solenoid valve 810*b* of the second air flow control block 810, advantageously via an inflation kit 118*a*, as also discussed hereinabove. During inflation, air will be compressed via both the first and second air compressors 802, 804 via the inflation solenoid valve 810*b*, wherein any air drier(s) is bypassed.

A control circuit, appropriately adapted from that of FIG. 3, is used to electronically control the series arranged air compressors system 800, which includes an electronic control module, switches, sensors and a display as mentioned hereinabove. The system is operated in a closed or partially closed state.

To those skilled in the art to which this invention appertains, the above described preferred embodiment may be subject to change or modification. Such change or modification can be carried out without departing from the scope of the invention, which is intended to be limited only by the scope of the appended claims.

The invention claimed is:

1. A series arranged air compressors system adaptable for use with a motor vehicle, comprising:

a first air compressor a second air compressor pneumatically connected to said first air compressor;

an electronic control circuit electronically interfaced with said first and second air compressors, wherein said electronic control circuit operates said first and second air compressors cooperatively so as to selectively provide a source of pressurized air;

at least one air flow control block selectively connected to said first and second air compressors, wherein at least one pressurized air output is located at said at least one air flow control block;

an air intake connected to at least one of said first air compressor and said at least one air flow control block;

an air exhaust connected to said at least one air flow control block; and at least one air reservoir connected to at least one of said first and second air compressors and said at least one air flow control block;

wherein said electronic control circuit is further electronically interfaced with said air flow control block;

wherein said electronic control circuit selectively regulates, utilizing said at least one air flow control block, air flow between said first air compressor, said second air compressor, said air intake, said air exhaust, and said at least one pressurized air output, and further selectively regulates operation of said first and second air compressors to thereby provide the source of compressed air at said at least one pressurized air output; and wherein said electronic control circuit further selectively regulates air flow with respect to said at least one air reservoir such that said system operates in at least one of an open state, a closed state and a partially closed state.

2. The series arranged air compressors system of claim 1, wherein said at least one air flow control block comprises:

a first air flow control block connected with at least one of said first and second air compressors; and a second air flow control block connected to said first air flow control block and to said at least one pressurized air output.

3. The series arranged air compressors system of claim 1, further comprising two said air reservoirs comprising a high pressure air reservoir and a low pressure air reservoir.

4. The series arranged air compressors system of claim 1 further comprising:

an inflation kit connectable to said at least one pressurized air output.

5. An air suspension system for a motor vehicle, comprising:

a plurality of compressed air actuated leveling devices; and a source of compressed air actuating said plurality of leveling devices, said source of compressed air comprising a series arranged air compressors system, said series arranged air compressors system comprising:

a first air compressor;

a first air flow control block connected to said first air compressor;

an air intake connected to said first air compressor and to said first air flow control block;

an air reservoir connected to said first air flow control block;

a second air compressor connected to said first air flow control block;

a second air flow control block connected to said second air compressor and connected to said first air flow control block, wherein said plurality of leveling devices are connected to said second air flow control block;

at least one air reservoir connected to at least one of said first and second air compressors and said at least one air flow control block;

an air exhaust connected to said first air flow control block; and an electronic control circuit electronically interfaced with said first and second air flow control blocks, said first and second air compressors, and said plurality of leveling devices; wherein said electronic control circuit selectively regulates, utilizing said first and second air flow control blocks, air flow between said first air compressor, said second air compressor, said air intake, said air exhaust, said air reservoir, and said plurality of leveling devices, and further selectively regulates operation of said first and second air compressors to thereby provide the source of compressed air to said plurality of leveling devices.

6. The air suspension system of claim 5, wherein said first and second air flow control blocks respectively comprise a plurality of interconnected solenoid valves operatively connected to said electronic control module.

7. An air suspension system for a motor vehicle, comprising: a plurality of compressed air actuated leveling devices; and a source of compressed air actuating said plurality of leveling devices, said source of compressed air comprising a series arranged air compressors system, said series arranged air compressors system comprising:

a first air compressor; and a second air compressor pneumatically connected to said first air compressor, wherein said first and second air compressors mutually cooperate to selectively provide a source of pressurized air;

at least one air flow control block selectively connected to said first and second air compressors and to said plurality of leveling devices;

an electronic control circuit electronically interfaced with said at least one air flow control block, with said first and second air compressors, and with at least a portion of said plurality of leveling devices;

an air intake connected to at least one of said first air compressor and said at least one air flow control block;

at least one air reservoir connected to at least one of said first and second air compressors and said at least one air flow control block; and an air exhaust connected to said at least one air flow control block; wherein said electronic control circuit selectively regulates, utilizing said at least one air flow control block, air flow between said first air compressor, said second air compressor, said air intake, said air exhaust, and said plurality of leveling devices, and further selectively regulates operation of said first and second air compressors to thereby provide the source of compressed air to said plurality of leveling devices.

8. The air suspension system of claim 7, further comprising:

at least one air reservoir connected to at least one of said first and second air compressors and said at least one air flow control block;

wherein said electronic control circuit further selectively regulates air flow with respect to said at least one air reservoir such that said system operates in at least one of an open state, a closed state and a partially closed state.

9. The air suspension system of claim 8, further comprising:

an inflation output of said at least one air flow control block providing access to the source of compressed air; and an inflation kit connectable to said inflation output.

10. The air suspension system of claim 8, wherein said at least one air reservoir comprises:

a high pressure air reservoir; and a low pressure air reservoir.

11. The air suspension system of claim 8, wherein said at least one air flow control block comprises:

a first air flow control block connected with at least one of said first and second air compressors; and a second air flow control block connected to said first air flow control block and to said second output and to said leveling devices.

12. The air suspension system of claim 8, wherein said electronic control circuit comprises:

an electronic control module; and a plurality of sensors connected with said electronic control module and at least a portion of said plurality of leveling devices.

13. The air suspension system of claim 12, wherein said electronic control circuit further comprises a display connected with said electronic control module which provides selective information with respect to said suspension system in response to an output from said electronic control module.

14. The air suspension system of claim 8, wherein said at least one air flow control block comprises a plurality of interconnected solenoid valves operatively connected to said electronic control module.

15. The air suspension system of claim 6, wherein said electronic control circuit comprises:

an electronic control module; and a plurality of sensors connected with said electronic control module and at least a portion of said plurality of leveling devices.

16. The air suspension system of claim 15, wherein said electronic control circuit further comprises a display connected with said electronic control module which provides selective information with respect to said suspension system in response to an output from said electronic control module.

17. The air suspension system of claim 16, further comprising:

an inflation output of one of said first and second air flow control blocks providing access to the source of compressed air; and an inflation kit connectable to said inflation output.

18. The air suspension system of claim 16, wherein said electronic control circuit further comprises a plurality of switches connected with said electronic control module which provide manual selection of operation of said air suspension system.

* * * * *